United States Patent [19]

Hoffmann

[11] 3,783,306

[45] Jan. 1, 1974

[54] LOW POWER RING COUNTER

[75] Inventor: Kurt Hoffmann, Sunnyvale, Calif.

[73] Assignee: American Micro-Systems, Inc., Santa Clara, Calif.

[22] Filed: Apr. 5, 1972

[21] Appl. No.: 241,275

[52] U.S. Cl. .............. 307/223 C, 307/205, 307/215, 307/221 C, 307/304, 328/43

[51] Int. Cl. ........................ H03k 21/00, H03k 19/08

[58] Field of Search ..................... 307/221 R, 221 C, 307/223 R, 223 C, 215, 205, 304; 328/37, 43

[56] References Cited

UNITED STATES PATENTS

| | | | |
|---|---|---|---|
| 3,047,738 | 7/1962 | Haas, Jr. | 307/223 R |
| 3,517,219 | 6/1970 | Okubo | 307/223 C |
| 3,575,610 | 4/1971 | Okubo | 307/223 C |
| 3,139,540 | 6/1964 | Osborne | 307/215 X |
| 3,284,645 | 11/1966 | Eichelberger et al. | 307/215 |
| 3,610,982 | 10/1971 | Rall | 307/215 X |
| 3,662,193 | 5/1972 | Braddock | 307/215 X |

*Primary Examiner*—Stanley D. Miller, Jr.
*Attorney*—Roger W. Erickson

[57] ABSTRACT

A ring counter that is operable by a relatively low power level comprises master and slave flip-flop sections having n stages connected in parallel to alternating clock means. Each stage has a series of AND-NOR gates including one AND-NOR gate used as a reset and connected to the other parts of the section. The alternating clocks for the master and slave sections are applied to advance the counter by shifting the direct current path from stage to stage. Each stage is self gated so that power is consumed only when that stage or flip-flop is being enabled.

5 Claims, 4 Drawing Figures

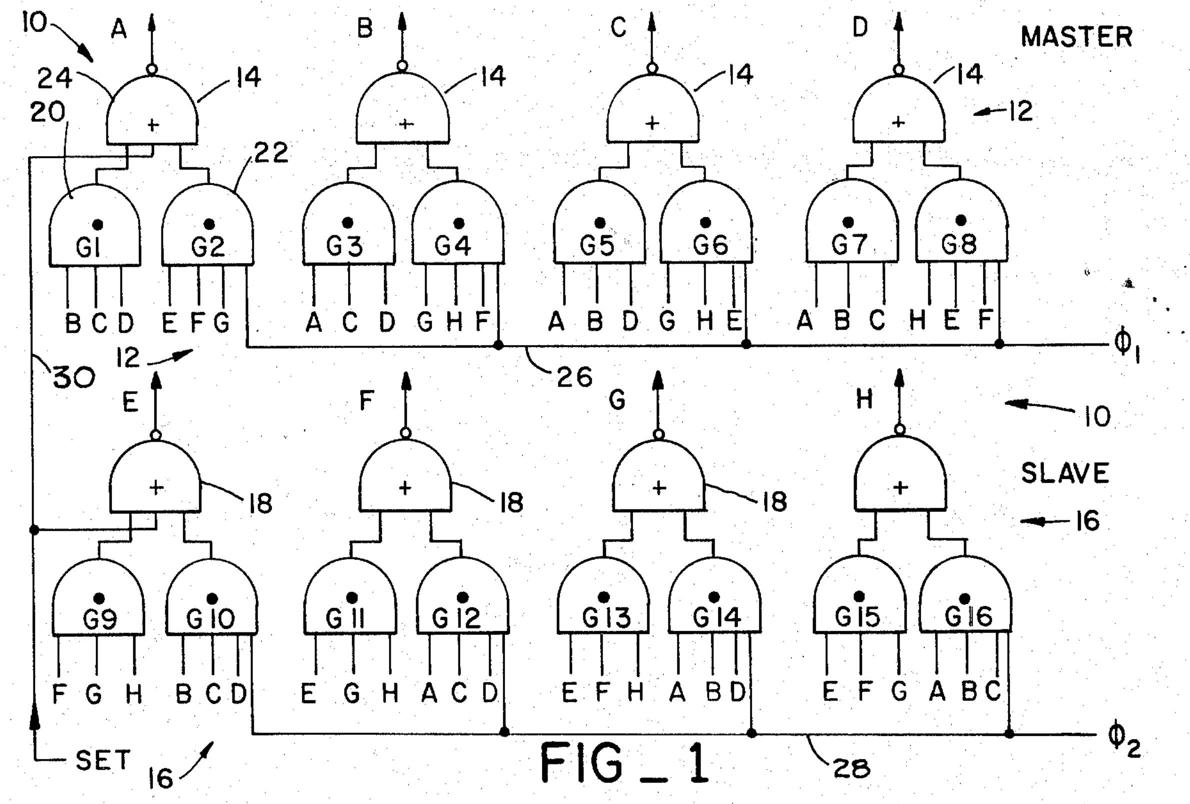
FIG_1
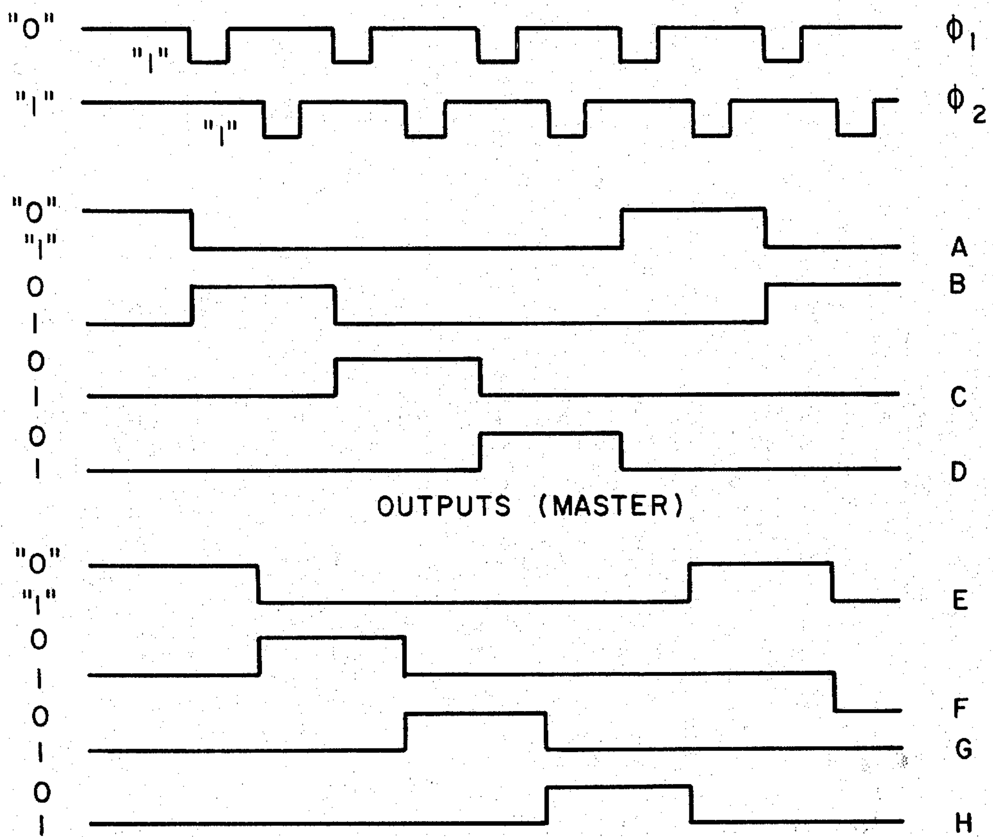
FIG_2 OUTPUTS (SLAVE)

PATENTED JAN 1 1974 3,783,306

SHEET 3 OF 3

LOW POWER RING COUNTER

BACKGROUND OF THE INVENTION

The present invention relates to ring counters and in particular to a ring counter having very low power dissipation.

Ring counters employing insulated gate field-effect transistors have been used for many types of circuits and are particularly adaptable for use in time-keeping devices such as clocks and the like. However, conventional counters were limited in their applications because they required a significant amount of power to operate. The circuit and the total power required was directly proportional to the number of stages, or in other words, for each stage of the counter an additional increment of power was required. A problem therefore arose of how to utilize ring counters in devices where only a relatively limited amount of power was available, such as in electronic watches.

One object of the present invention is to solve the aforesaid problem and provide a low-power ring counter.

It is another object of this invention to provide a low-power ring counter having two-phase clock control.

Another object of this invention is to provide a ring counter whose current path on each clock pulse shifts from one stage to the next with each clock pulse so that power is consumed only by one stage at a time rather than all of the stages.

Another object of this invention is to provide a low-power ring counter particularly adaptable for manufacture as an integrated circuit semiconductor device which can be made small enough for use in an electronic watch.

Another object of this invention is to provide a ring counter whose power consumption is not a function of the number of flip-flops used on the length of the register.

Yet another object of this invention is to provide a low power ring counter having master and slave sections wherein the power required for operation does not exceed that amount normally utilized for one stage of the counter.

Other objects, advantages and features of the invention will become apparent from the following detailed description taken in conjunction with the drawing.

SUMMARY OF THE INVENTION

Broadly, a ring counter in accordance with the invention comprises master and slave sections forming a number of counter stages. Each section is comprised of master-slave stages utilizing a series of input AND-NOR gates, one such gate being used for set in each section. The outputs of the various stages of the master and slave sections are connected to the other gates of the different stages. The entire master section and the slave section are connected in parallel between a voltage source and ground and are clocked by a two phase alternating clock means. The gates of the various master and slave stages stage to stage to produce outputs in the usual ring counter sequence. Yet, the power consumed is limited to only that amount consumed by the one gate or stage that is activated during each clock pulse and produces an output.

BRIEF DESCRIPTION OF THE DRAWING

FIG. 1 is a logic diagram of a ring counter embodying the principles of the invention;

FIG. 2 is a graphical representation of a clock time relationship for the ring counter of FIG. 1;

DESCRIPTION OF THE PREFERRED EMBODIMENTS

Figure 3:
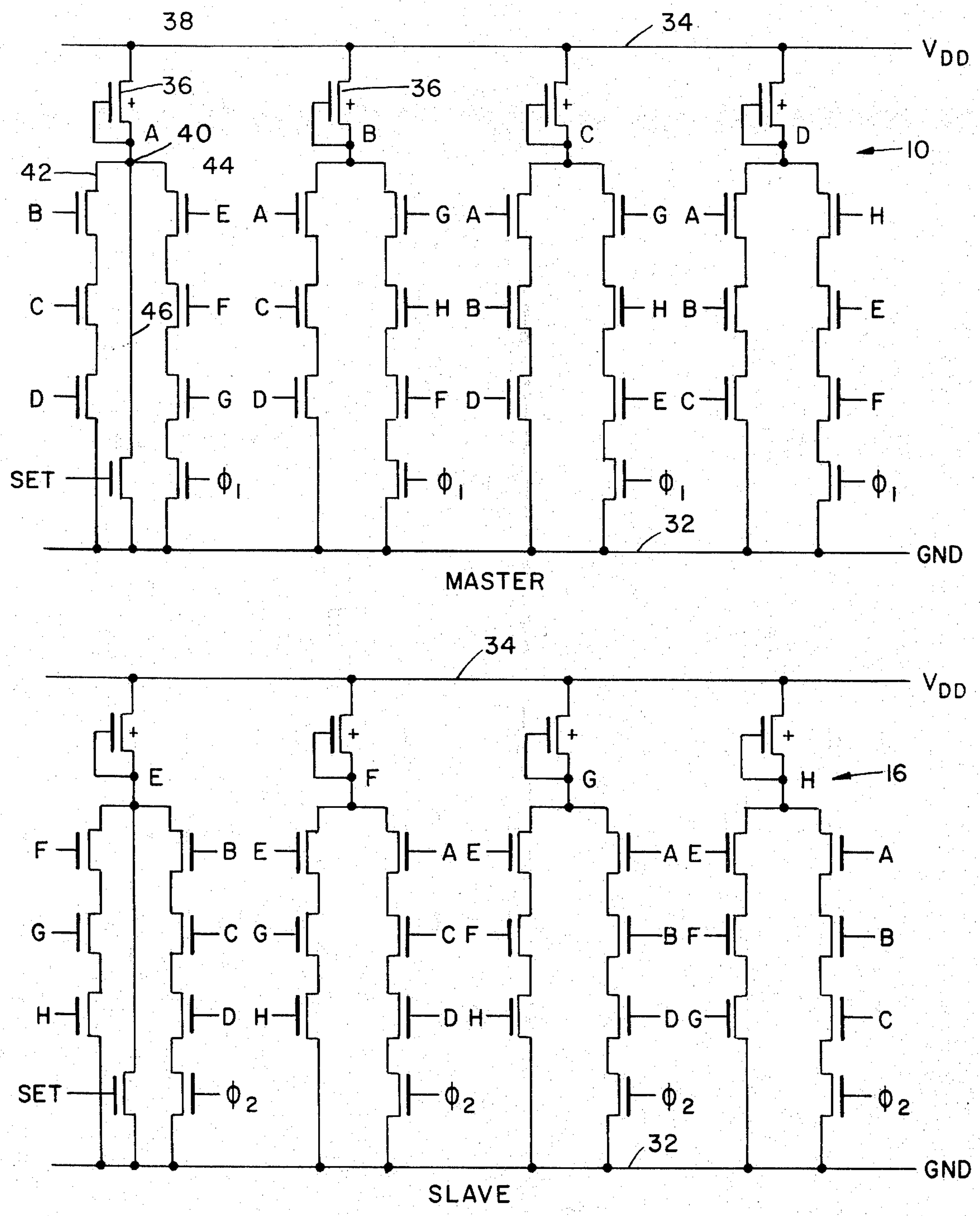
FIG. 3 is a schematic circuit diagram showing one implementation of the ring counter depicted in FIG. 1.

The general logic arrangement of 1:4 ring counter 10 according to my invention is shown in FIG. 1. It should be understood that the counter 10 is merely one embodiment of my invention and the principles thereof are applicable to ring counters of any desired size. Generally, it comprises a master section 12 comprised of a series of four stages 14 and a slave section 16 having a similar series of stages 18. Each of these stages is comprised of a pair of AND gates 20 and 22 whose outputs are received by a NOR gate 24. The output from each NOR gate 24 is supplied to the gate 20 or 22 of all the other three master and slave stages. Thus, each of the AND gates 20 and 22 has three inputs comprised of outputs from the other master and slave stages. In the master section the AND gates for stage 1 are designated G1 and G2, for stage 2 they are G3 and G4, for stage 3 they are G5 and G6 and for stage 4 they are G7 and G8. In the slave section the AND gates of the stages 1 through 4 are similarly designated G9 through G16, respectively. A first clock pulse ($0_1$) is supplied through a lead 26 from a suitable clock means to each of the AND gates 22. Similarly, an alternatively timed second clock pulse ($0_2$) is supplied through a lead 28 connected in parallel to the AND gates of the slave section 16.

A set signal is provided by means of a lead 30 to the NOR gates 24 of the master and slave sections.

In the 1:4 ring counter shown in FIG. 1, the outputs of the NOR gates of the master section are designated as A, B, C and D, while the outputs from the associated slave gates are designated E, F, G and H. All of these NOR gates are connected by appropriate leads to the various AND gates in the manner illustrated. In FIG. 2, a timing diagram illustrates how the values of these outputs vary in a stepping manner in accordance with the two alternating or out-of-phase clock pulses $0_1$ and $0_2$.

In operation, a set signal (logic 1) is applied to the set input of the ring counter, namely the NOR gates A and E of the first master and slave stages. Since a single "high" or logic "1" input to a NOR gate produces a "low" output, these gates A and E switch to the "0" logic state. This switches the counter into the state:

| ABCD | EFGH |
|---|---|
| 0 1 1 1 | 0 1 1 1 |

When the set signal is removed, the counter remains in that state, since the logic 1 outputs on gates B, C, D and F, G, H produce a "high" output from the AND gates G1 and G9, which maintains the NOR gate outputs A and E at a logic 0 level. Now, when the first clock pulse $0_1$ occurs and applies a logic 1 input to the AND gates 22 in each stage of the master section, the counter switches into the stage:

A B C D   E F G H
1 0 1 1   0 1 1 1

This occurs because a NOR gate will produce a logic 0 whenever either of its inputs (from the AND gates 20 or 22) is "high" or a logic 1. Now, since all the inputs to gate G4 are a logic 1 its output is a logic 1 and therefore the output of the NOR gate B is a logic 0. Thus, the current path has now shifted from stage A to stage B. Since all the other NOR gates are receiving "low" inputs from both of their AND gates 20 and 22, their outputs are all "high". When the clockpulse $0_1$ is removed, the counter does not change its stage since the outputs A, C, D are at a logic 1 and gate G3 keeps the output of gate B of the second stage at logic 0.

Now, a clock pulse $0_2$ (logic 1) is applied to the "slave" section which switches the counter into the stage:

A B C D   E F G H
1 0 1 1   1 0 1 1

This occurs because the inputs A. C, D, $0_2$ of G/12 are now all in a logic 1 state. Thus, the current path shifts from gate "E" to gate "F." Again, the counter does not change state after removal of the clock pulse $0_2$ since the outputs E, G and H of Gate 11 are also at the logic 1 state. The NOR Gate F of this stage therefore receives a logic 1 input and maintains its 0 output.

It is seen that all of the AND gates 20 and 22 of the master and slave sections receive their inputs from the outputs of the other stages in addition to the single clock inputs. Thus, as the clockpulses $0_1$ and $0_2$ occur alternatively the current path shifts from one stage to the next and the counter switches into the following states:

| A B C D | E F G H | $0_1$ | $0_2$ |
|---|---|---|---|
| 1 1 0 1 | 1 0 1 1 | 1 | 0 |
| 1 1 0 1 | 1 1 0 1 | 0 | 1 |
| 1 1 1 0 | 1 1 0 1 | 1 | 0 |
| 1 1 1 0 | 1 1 1 0 | 0 | 1 |
| 0 1 1 1 | 1 1 1 0 | 1 | 0 |
| 0 1 1 1 | 0 1 1 1 | 0 | 1 |
| etc. | | | |

As seen from the above, the current path switches with each clock pulse so that the only power consumed by the counter is that required for the single activated stage.

Shown in FIG. 3 is a simple implementation of the logic circuitry for my ring counter which is particularly adaptable for embodiment in an integrated circuit semiconductor device using insulated gate field effect transistors (IGFETS). Here, the stages of both the master and slave sections are connected in parallel between a ground line 32 and a power or $V_{DD}$ line 34. Each stage comprises a load transistor 36 which serves as a NOR gate connected at one junction 38 to the $V_{DD}$ line at its other junction 40 to two lead branches 42 and 44 connected to the ground line 32. These transistors 36 are lettered to indicate the same NOR gate arrangement as in FIG. 1. Each of the branches 42 has three source-drain connected logic transistors which are assigned letter designations indicating their gate connection with one of the NOR gates, and the other branch 44 has four similarly connected logic transistors, three of which are similarly gate connected to their respective NOR gates, the fourth transistor being gate connected to the clock phase $0_1$. A set signal lead 46 containing a "set" transistor is connected between the junction 40 and the ground line, the gate of the "set" transistor being connected to a suitable "set" pulse source. The operation of this counter circuit is the same as explained with reference to FIG. 1, and in this diagram the shifting of the current path can be readily followed. When current flows through a load transistor or NOR gate in one stage the state of that transistor is applied to all of the similarly designated gates of the other stages. Thus, when the set signal is applied the current flows in transistor A and it thus applies a logic 0 signal to the connected logic transistors in the other stages. Since initially no clock pulse is present the gates B, C, D and F, G, H are at the logic 1 state. When the clock pulse $0_1$ occurs, the branch lead 44 containing gates G, H, F and $0_1$ now conducts and this causes the gate B to conduct current and switch to a logic 0 state.

Figure 4:
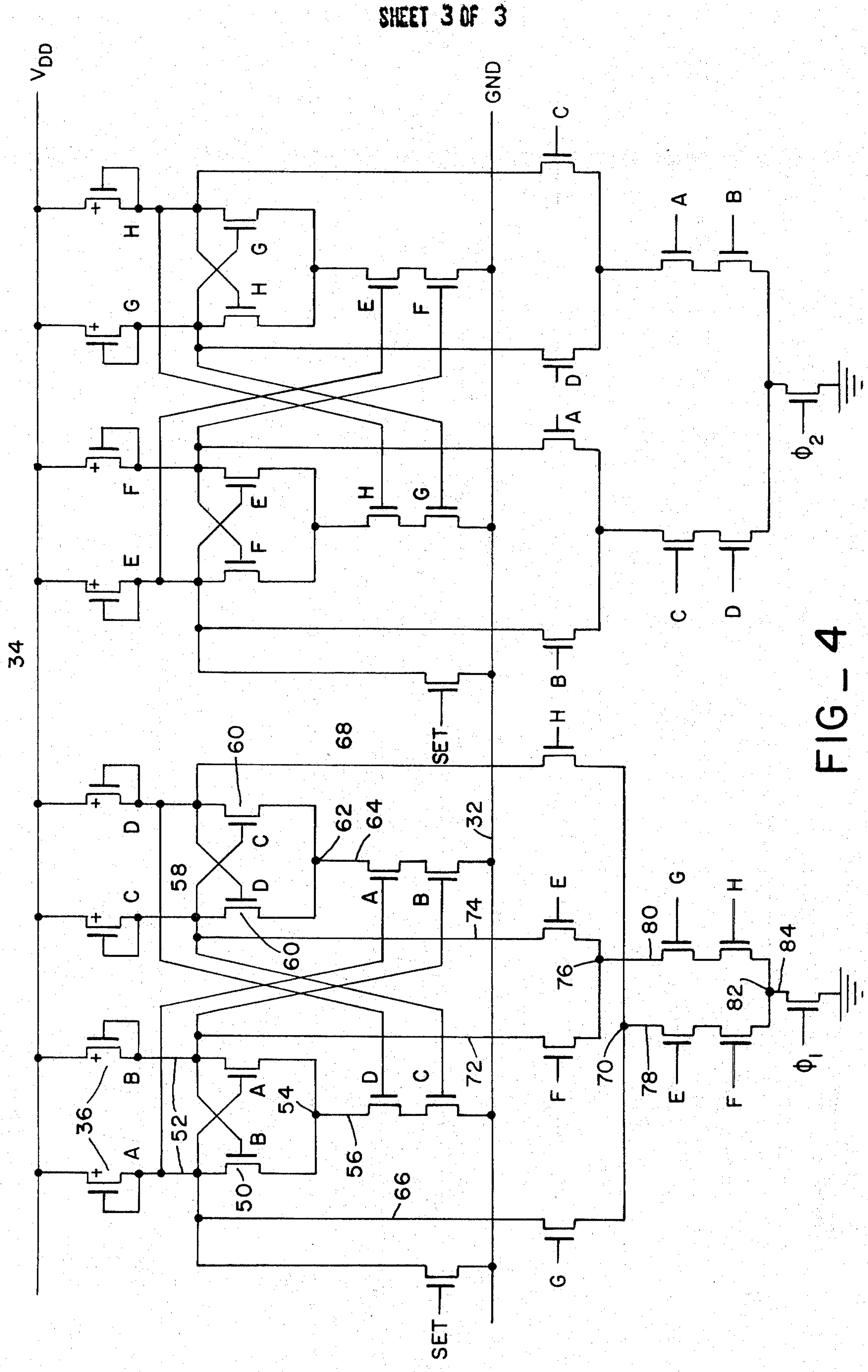
FIG. 4 is a schematic circuit diagram showing another implementation of the ring counter of FIG. 1.

The implementation of FIG. 4 illustrates a circuit for my ring counter wherein the same functions are accomplished with far fewer transistors. Here, power is again supplied through the $V_{DD}$ line 34 providing a potential defined as the logic 1 level to the ground line 32 defined as the logic 0 level, and the master and slave sections are arranged in parallel between these power and ground lines. As in the embodiment of FIG. 3, each stage of the master and slave section is comprised of a load transistor 36 designated with the same gate letters A, B, C, etc. as previously used, and connected in series to a first logic transistor 50. The leads 52 of the first two stages (A and B) connect at a junction 54 to another lead 56 containing two more logic transistors whose gates are connected to the outputs of the NOR gates or transistors C and D, and this lead terminates at the ground line 32. The third and fourth stages (C & D) of the master section are similarly comprised of a pair of leads 58 each containing its load transistor 36 in series with a first logic transistor 60 which terminates at a junction 62 connected by a lead 64 to the ground line and containing two other logic transistors in series whose gates are connected to the load transistors A and B, respectively. To provide a sharing arrangement for the various logic transistors, a pair of leads 66 and 68 are connected to the load transistors A and D and meet at a junction 70. Lead 66 contains a transistor whose gate is connected to the gate G and lead 68 contains a transistor whose gate is connected to the load H. Similarly, a pair of leads 72 and 74 from the gates B and C contain a pair of logic transistors whose gates are connected to gates F and E respectively, and these gates terminate at a junction 76. To this junction is attached a lead 78 containing two transistors in series whose gates are connected to the gate outputs E and F respectively, and from the junction 76 extends a similar lead 80 containing two other transistors in series whose gates are connected to the outputs G and H. These latter leads terminate at a junction 82 which is connected to ground by a lead 84 that contains a transistor whose gate is connected to the clock means $0_1$.

The slave section has a circuit arrangement similar to the master section with its various stages being controlled by load transistors E. F, G and H. The operation of the circuit of FIG. 4 is the same as that of FIG. 3 although fewer logic transistors are required because various logic transistors are connected to and control the gates on two counter stages at one time. With a potential of a predetermined magnitude existing between $V_{DD}$ and ground lines, the clocks $0_1$ and $0_2$ supply alternating clock pulses. Initially, the (logic 1) "set" signal is applied to the gates of two "set" transistors which are connected to the load transistors A and B respectively causing these loads to conduct to ground and go to a logic 0 state. The counter thus switches into the state

| A B C D | E F G H |
|---|---|
| 0 1 1 1 | 0 1 1 1 |

As previously described, upon removal of the set signal the counter remains in that state since the logic 1 on outputs B, C, D and F, G, H forces output A and E to logic 0 respectively. When the first clock pulse $0_1$ (logic 1) is applied to the master section it travels through lead 80, junction 76 and lead 72 to enable the NOR gate B and thereby cause the current path to shift from the load device A to the next load device B. As each clock pulse occurs the counter continues to shift the current path and the various logic transistors arranged in a sharing manner perform their gating functions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A ring counter comprising master and slave sections having a plurality of stages, each said stage being connected between power and ground lines and including a pair of multiple input AND gates and a NOR gate connected to the outputs of said AND gates, means directly connecting the output of each said NOR gate to one AND gate of each of the other stages in both the master and slave sections, a first clock means connected to one AND gate of each stage in the master section, and a second alternating clock means connected to the one AND gate of each stage in the slave section and means for providing a set signal to put one stage in a state to initially provide a current path, whereby subsequent clock pulses cause the current path to shift from one stage to the next in the master and slave sections.

2. The ring counter of claim 1 wherein each said stage comprises a load transistor connected to a pair of leads each containing a plurality of logic transistors connected in series to said ground line, the gates of said logic transistors being connected to the load transistors of the other stages, and one of said leads containing an additional transistor whose gate is connected to one of said clock means.

3. The ring counter of claim 2 including means interconnecting certain of said logic transistors in said stages so that their gating function is shared between two stages.

4. The ring counter of claim 2 wherein said transistors are insulated gate field effect devices formed on a single integrated circuit semiconductor device.

5. The ring counter of claim 1 wherein said NOR gates of each stage in said master and slave sections each comprise a load transistor and said and gates comprise a first logic transistor in series with said load transistor, said logic transistors in a first and second pair of stages and a third and fourth pair of stages in both master and slave sections being connected through a first junction to said ground line through a pair of second logic transistors in series, a third pair of logic transistor each connected in series with a said load transistor of said first and fourth stages and to a second junction, and a fourth pair of logic transistors, each connected in series to a load transistor of said second and third stages and to a third junction, a fourth pair of logic transistors connected in series between said second junction and a fourth junction and a fifth pair of logic transistors connected in series between said third junction and said fourth junction, said logic transistors having gates connected directly to the outputs of said master and slave sections, a timing transistor connected to said fourth junction, and periodic clocking means connected to the gate of said timing transistor.

* * * * *

UNITED STATES PATENT OFFICE
CERTIFICATE OF CORRECTION

Patent No. 3,783,306 Dated January 1, 1974

Inventor(s) KURT HOFFMANN

It is certified that error appears in the above-identified patent and that said Letters Patent are hereby corrected as shown below:

Col. 1, line 63, after "stages" insert --are connected so that as the ring counter is energized by alternating clock pulses, the current path is shifted from--.

Signed and sealed this 23rd day of April 1974.

(SEAL)
Attest:

EDWARD M.FLETCHER,JR.
Attesting Officer

C. MARSHALL DANN
Commissioner of Patents